No. 794,230. PATENTED JULY 11, 1905.
E. KEUP.
ELASTIC TIRED WHEEL.
APPLICATION FILED MAR. 15, 1904.
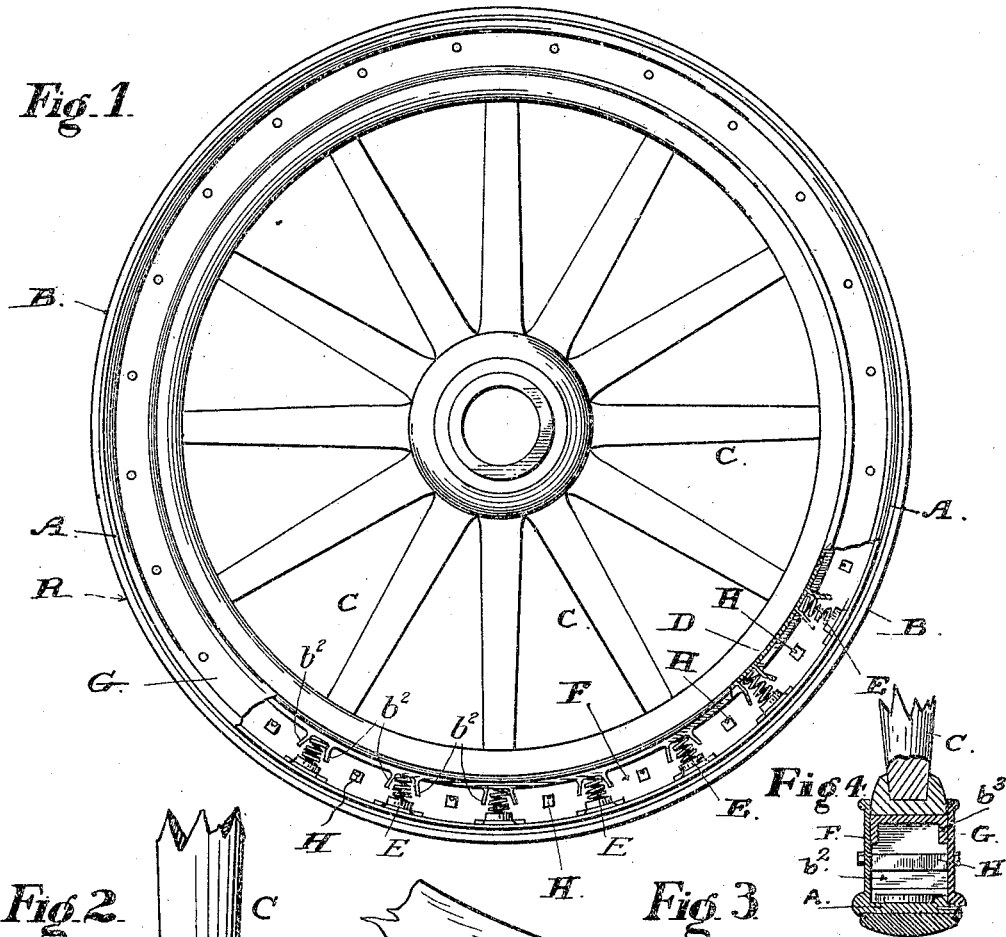
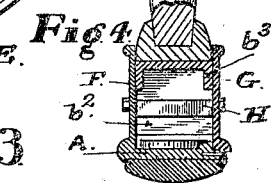
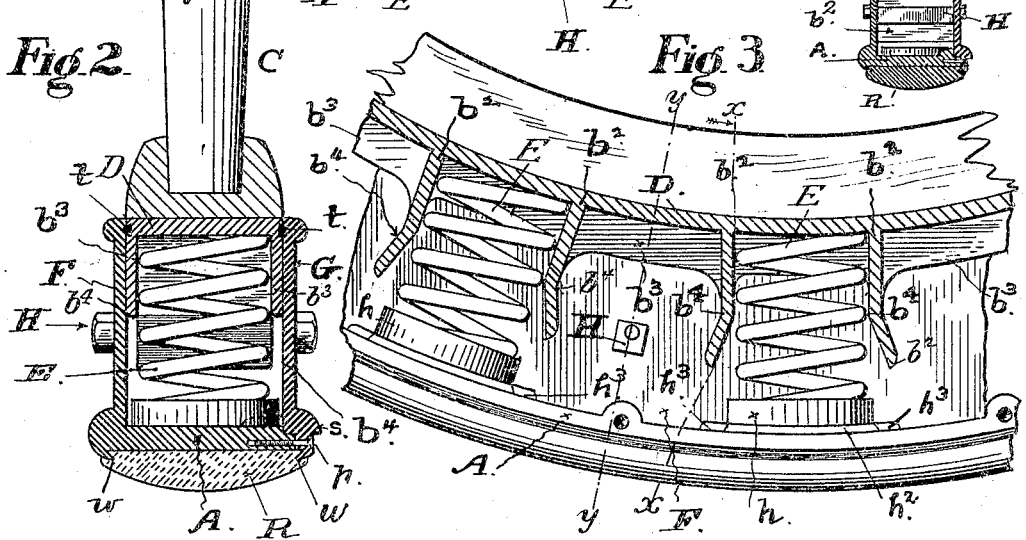
Witnesses.
Arthur L. Slee
M. Regner
Inventor.
Emil Keup
By E. E. Osborn
Atty No. 794,230. Patented July 11, 1905.

UNITED STATES PATENT OFFICE.

EMIL KEUP, OF SAN FRANCISCO, CALIFORNIA, ASSIGNOR OF ONE-HALF TO RICHARD G. CHISHOLM, OF SAN FRANCISCO, CALIFORNIA.

ELASTIC-TIRED WHEEL.

SPECIFICATION forming part of Letters Patent No. 794,230, dated July 11, 1905.

Application filed March 15, 1904. Serial No. 198,365.

*To all whom it may concern:*

Be it known that I, EMIL KEUP, a citizen of the United States, residing at San Francisco, in the county of San Francisco and State of California, have invented new and useful Improvements in Elastic-Tire Wheels, of which the following is a specification.

This invention has for its object an improved construction of elastic wheel for automobiles and other vehicles that are designed to be driven at high speed.

The invention relates more especially to a wheel of that class or description in which the rim is separately movable axially to a limited extent upon the central part or body and having springs interposed between the tire and the central part to give the required elastic action when the wheel is running in contact with the ground; and the invention consists in a novel construction of elastic rim, in the manner of confining coiled springs in place between the inner and the outer rim of the wheel, in the construction of the movable outer rim, and in the manner of controlling the movement axially of the central part of the wheel within the rim.

The following description explains at length the nature of the improvements and the manner in which I proceed to construct, produce, and carry out the same, reference being had therein to the accompanying drawings, forming part thereof.

Figure 1 is an elevation of a vehicle-wheel constructed according to my invention, a portion of the side plate of the rim being broken away to expose the interior construction. Fig. 2 is a vertical transverse section through the rim, taken through the line $x\,x$, Fig. 3, on an enlarged scale, showing the parts in their normal position when the load on the axle is not sufficiently heavy to compress the springs nearest the point of contact of the tire with the ground. Fig. 3 is a side view, on the same enlarged scale, of a segment of the rim with the side plate removed and the inner member of the rim in section. Fig. 4 is a transverse section similar to Fig. 2, but taken through the line $y\,y$, Fig. 3, illustrating the position of the parts when the outer rim is set eccentrically to the central part and the springs are compressed under the weight of the load.

The parts of the wheel are referred to in this description as the movable tire A; the tread B, secured on its outer face; the inner rim D, to which the spokes C are joined; the coiled springs E; the side plates F G, one of which is integral with the tire, and the other is secured in place in such manner as to be detachable to give access to the spring-holding space within the rim, and the stops H.

The tire A and the side plates F G inclose a continuous channel with straight and parallel sides and in width corresponding to the fixed rim D of the body or central part of the wheel, and in this channel the rim D is so fitted that the tire has movement axially or in the direction of the revolving motion and is also free to move in an angular direction or radially under the weight of the load and the alternate compression and expansion of the coiled springs as the wheels move in contact with the ground.

The coiled springs are arranged at intervals apart around the circumference of the wheel on radial lines and usually with a spring in line with every spoke.

The inner rim D is a flat continuous strip of metal on the curved outer face of which are cross-ribs $b^2$, standing perpendicularly outward in pairs all around the circumference and joined by side pieces or webs $b^3$ on both sides. The space or recess inclosed between every two ribs $b^2$ and the webs $b^3$ that join them form a cell to contain the spring E. Helical springs of uniform diameter are used, and these are fitted loosely between the ribs to have limited play, with sufficient movement sidewise to allow for the transverse flexure of the spring which takes place whenever the central part of the wheel runs ahead of the outer rim. The end of that portion of the spring lying within the sides of the cell is loosely set, as before mentioned, and is not attached or secured in any manner to the central body of the wheel. Its opposite end is held in place upon the back of the tire or outer rim A by means of a standing ring or circular flange $h$, in which the first coil of the spring is confined, but is not fastened. The ring $h$ is of such height that the spring cannot slip out when the opposite end, which is confined between the ribs, is carried ahead by the movement of the inner rim D within the sides F G of the outer rim. The sockets $h$ are secured to the rim A by a dovetail fastening, as shown in Fig. 3, where the base $h^2$ of the socket-piece fits between the dovetailed strips $h^3$ on the back of the rim A. By this means the sockets are fixed in place without screws, rivets, or other like fastenings, that tend to weaken the rim, to the strength and stiffness of which they also contribute to such an extent that the movable rim will resist the lateral strains that are thrown on it when running on rough or uneven ground or striking obstructions and will retain its circular shape under a heavy load.

One of the side plates of the outer rim is made integral with the body; but the other plate G is a separate part secured in place by screws $p$ with countersunk heads, located under a protecting bead or ledge S on the side of the plate.

The rim D should fit closely into the channel or space between the side plates F G, and a packing $t$ should be introduced between the faces to exclude dust and water. This packing is set in a groove in the edge of the inner rim, as shown in the cross-section Fig. 2.

It will be noticed that the ribs $b^2$, that form the cross-walls of a cell, diverge from a straight line in opposite directions above the webs $b^3$, as from the point $b^4$ out to the end of the cross-wall, as seen in Fig. 3. The purpose of increasing the width of the cell in this manner above or beyond the web $b^3$ is to give room for the spring to bend as well as undergo compression without being cramped or restricted in its movements, while it is always confined in place in its cell.

The outer rim slides on the rim carried by the central part of the wheel, the same as in other wheels of this class; but in the present construction the extent of this movement axially is limited by a number of cross-pins H, fixed in the side plates F G and extending across the space that separates one cell from the next in such position that each pin H forms a stop against which the cross-walls $b^2$ will strike, and thus prevent further axial movement of the outer rim. These stop-pins are placed at regular intervals around the circumference and usually between every cell and the next one in front and behind. The stop-pins H also serve to draw up and hold the side plates parallel, for which purpose the ends of the pin are turned off and are screw-threaded for nuts. The threaded ends being inserted through holes in the side plates, the plates are drawn against the shoulders on the pin by screwing up the nuts. The pins also strengthen the outer rim by tying the side plates together at short intervals all around the circumference.

A rubber tread is secured upon the face of the metal tire when desired by providing dovetailed recesses $w$ on the edges around the circumference, as illustrated in Fig. 2, where a solid-rubber tread R is shown applied to the face of the outer rim; but by omitting the dovetail on the rim a metal tread is provided.

What I claim as my invention, and desire to secure by Letters Patent, is—

1. In an elastic-tire wheel a central part comprising a hub, spokes and a rim having cross-ribs on the face and longitudinal webs uniting the ribs, said ribs being arranged in pairs to form spring-containing cells at intervals apart around the circumference; in combination with a movable outer rim consisting of a tire, side plates on the edges thereof inclosing a channel with continuous walls adapted to receive the cell-carrying rim of the central part, sockets on the bottom of the channel, helical springs in the cells having their ends confined in said sockets and stops on the outer rim adapted to limit the movement axially of the rim.

2. In an elastic-tire wheel, an inner rim having cross-ribs on the outer face arranged in pairs circumferentially of the wheel, longitudinal webs uniting said cross-ribs, a movable outer rim comprising a tire, side plates thereon forming a channel with parallel sides inclosing the inner rim, sockets in the channel, helical springs interposed between the inner and the outer rim and cross-pins fixed in the side plates and extending across the space between each pair of ribs.

3. In an elastic-tire wheel an inner rim having spring-containing cells on the outer face formed integrally with the rim and having diverging cross-walls, in combination with an outer rim comprising a tire, side plates on the edges of the tire extending at right angles toward the axis, one of said plates being detachable, helical springs in the cells between the outer and the inner rim, and cross-pins uniting the side plates together and adapted by contact with the cross-walls to limit the movement axially of the outer rim upon the inner rim.

In testimony whereof I have hereunto set my name to this specification in the presence of two subscribing witnesses.

EMIL KEUP.

Witnesses:
   Geo. T. Knox,
   E. E. Osborn.